Feb. 10, 1931. J. M. ABEEL 1,791,651
ANIMAL TRAP
Filed Jan. 29, 1929
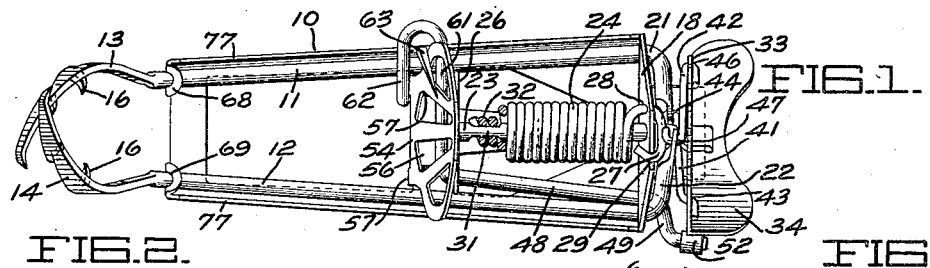
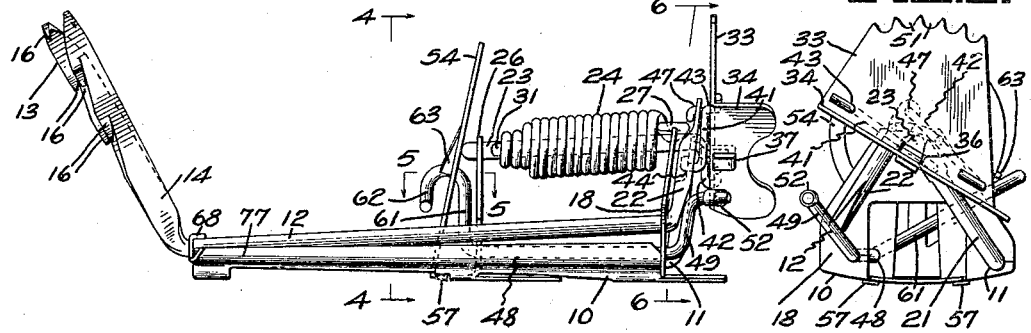
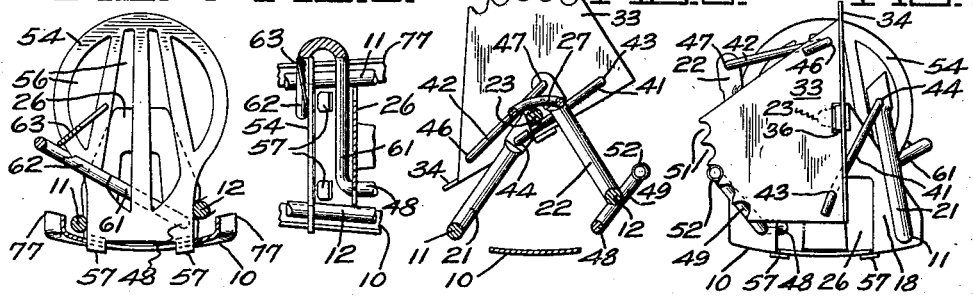
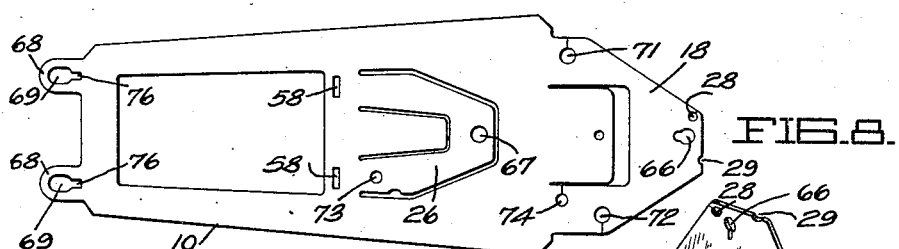
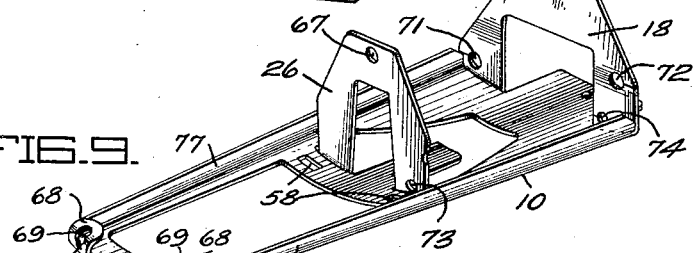
INVENTOR:
James Martin Abeel
BY
White, Prost & Fryer
ATTORNEYS Patented Feb. 10, 1931

1,791,651

UNITED STATES PATENT OFFICE

JAMES MARTIN ABEEL, OF SEBASTOPOL, CALIFORNIA

ANIMAL TRAP

Application filed January 29, 1929. Serial No. 335,776.

This invention relates generally to animal traps designed particularly for catching burrowing animals, such as gophers.

It is a general object of this invention to devise an animal trap of the above character which is highly effective and which can be readily set by an operator.

It is a further object of this invention to devise an animal trap of relatively simple and rugged construction, the parts of which can be readily manufactured, and which can be readily assembled.

It is a further object of this invention to devise novel mechanism for applying spring tension to the impaling or jaw members of an animal trap, which mechanism will serve to utilize the spring tension most effectively.

It is a further object of this invention to devise an animal trap having a pair of impaling or jaw members, and a trigger mechanism which will permit the impaling members to be set in any one of a number of different positions.

Further objects of the invention will appear from the following description in which I have set forth the preferred embodiment of my invention. It is to be understood that the appended claims are to be accorded a range of equivalents consistent with the state of the prior art.

Referring to the drawing:

Figure 1 is a plan view illustrating a trap constructed in accordance with my invention.

Fig. 2 is a side elevational view of the trap shown in Fig. 1.

Fig. 3 is an end view of the trap shown in Figs. 1 and 2.

Fig. 4 is a cross sectional view taken along the line 4—4 of Fig. 2.

Fig. 5 is a cross sectional detail taken along the line 5—5 of Fig. 2.

Fig. 6 is a cross sectional view taken along the line 6—6 of Fig. 2.

Fig. 7 is an end view similar to Fig. 3, but illustrating the position of certain parts when the trap is in set position.

Fig. 8 is a plan view of a sheet metal blank before the same is set to form the base of my trap.

Fig. 9 is a perspective view illustrating the blank of Fig. 8 bent to form the base of my trap.

Referring to Figs. 1 to 3 inclusive, my trap preferably consists of a base member 10 formed of sheet metal as will be presently described. A pair of shafts 11 and 12 are journaled to base members 10 in side by side relationship. Secured to corresponding ends of shafts 11 and 12, are the impaling or jaw members 13 and 14. I prefer that shafts 11 and 12 be disalined or converging, and that the impaling members 13 and 14 be curved inwardly toward each other, so that their ends cross when the trap is in sprung position as shown in Fig. 1. Impaling members 13 and 14 also extend at an obtuse angle with respect to their corresponding shafts, as shown in Fig. 2. This arrangement makes the trap more effective for catching animals of different sizes. Suitable teeth or prongs 16 can be provided upon the impaling members.

Upon one end of base 10 I provide an upstanding portion 18 which serves as a support and as means for journaling certain of the moving parts to be presently described. Shafts 11 and 12 are extended thru portion 18 and bent laterally to form lever arms 21 and 22. Likewise extending thru portion 18 and journaled within the same, there is a shaft 23, about which is coiled a helical spring 24. The end of shaft 23 remote from portion 18, is extended thru and suitably journaled in a portion 26, likewise secured to and extending upwardly from base member 10. One end of coiled spring 24 is fixed with respect to base 10, and for effecting this result I have shown one terminal portion 27 of the spring extended thru an aperture 28 in portion 18, and bent back upon itself to rest upon a notch 29. The other end of spring 24 is wrapped about a flattened portion 31 of shaft 23, so that tension of the spring tends to rotate the shaft in one direction. In manufacture after the convolutions 32 have been wrapped upon the flattened portion 31, these convolutions are flattened by lateral pressure to tightly interlock with the shaft 23.

Fixed to that end of shaft 23 which extends beyond portion 18, there is a plate 33, this plate having an integral fingerhold portion 34 engageable by an operator for effecting rotation of the same against the torsional tension of spring 24. As suitable means for securing plate 33 to shaft 23, I have shown the end of shaft 23 flattened and extended thru an aperture 36 in plate 33. It is also extended thru an aperture 37 provided in fingerhold portion 34, and is then bent back upon itself to securely lock the same to plate 33. As a novel means for connecting plate 33 with lever arms 21 and 22, I have shown links 41 and 42 connected between the ends of the arms and the plate. For example link 41 is pivotally connected to plate 33 as indicated at 43, and pivotally connected to arm 21 as indicated at 44. Likewise link 42 is pivoted to plate 33 at 46 and to arm 22 at 47.

Spring 24 because of its torsional tension normally urges plate 33 to rotate in a clockwise direction when viewed as in Fig. 3. Rotation in this direction is limited by abutment of link 41 with the bottom side of shaft 23, as shown in Fig. 3. This position of plate 33 corresponds to what may be termed "normal sprung" position of the trap, and when in this position it will be noted that points corresponding to pivotal connections 44 and 47 are located closer to shaft 23 than the points of pivotal connection 43 and 46.

To provide trigger means for retaining the trap in set position, I have shown a rod 48 extended to and journaled in both upright portions 18 and 26. One end of rod 48 is provided with an arm 49, adapted to engage in any one of a plurality of notches 51, which are formed in a segmental portion of plate 33. I prefer that the engagement between arm 49 and plate 33 be between two dissimilar metals, one of which is preferably non-corrodible. Generally therefore I form plate 33 of ordinary steel, and a collar 52 of non-corrodible metal, such as brass, is fixed to arm 49 in a position to engage with notches 51. It is apparent however that these materials can be reversed and plate 33 can be made of non-corrodible metal such as brass, while the complementary engaging surface of arm 49 can be made of steel.

Extending upwardly from base 10 and pivotally secured to the same, there is a trigger member 54, which is intended to be engaged by the animal for tripping the trap. Trigger member 54 can be conveniently made of sheet metal having punched out openings 56. To provide a pivotal connection for member 54, the lower edge is provided with integral tabs 57, which normally extend thru apertures 58 in base member 10. These tabs 57 are bent laterally on the under side of the base member to prevent their removal from apertures 58.

Shaft 48 is also provided with an arm 61 extending behind the trigger member 54, and having a doubled back portion 62 extending in front of trigger member 54. Arm 61 therefore limits movement of trigger member 54 in either direction. A shoulder 63 fixed to one face of trigger member 54 serves to engage in the upper edge of arm portion 62. I prefer that shoulder 63 and arm portion 62 be made of different materials one of which is non-corrodible, and accordingly element 63 is made of brass, while arm portion 62 is of steel.

In Fig. 8 I have shown a sheet metal blank or stamping which can be utilized in the construction of the above described trap. Fig. 9 shows this stamping bent to form the base member shown in Figs. 1 to 3 inclusive. Apertures 66 and 67 in portions 18 and 26 form bearings for the shaft 23. Integral lugs 68 are provided with apertures 69 to receive shafts 11 and 12, these shafts also extending thru apertures 71 and 72 in portion 18. Aperture 73 in portion 26 serves as a bearing for rod 48 together with aperture 74 in portion 18. In order to obviate the necessity of threading certain rods and shafts thru certain of the apertures in the base member when the parts of the trap are being assembled, I preferably form slits or incisions from certain apertures to the adjacent edges of the sheet metal. For example such incisions are shown in connection with apertures 71, 28, 72 and 74.

As shown in Figs. 1 to 3 inclusive, each shaft together with its impaling member and lever arm, is preferably formed of one integral piece of material. For example a rod can be flattened and properly bent to form an impaling member upon one end of the same. The ends of arms 21 and 22 are flattened to facilitate making pivotal connection to the same, and this flattening operation is preferably formed before the shafts are assembled with respect to the base members. To permit insertion of the flattened ends thru lugs 68, these lugs are preferably provided with slots 76. The bending operation for forming the arms 21 and 22 can be made after the shafts are assembled upon the base.

In order to stiffen the structure, the base member has turned up edges 77, forming in effect stiffening flanges. Further stiffening is provided by curving the base as shown in Figs. 4 and 9, this curving also serving to permit the trap to more readily fit within a gopher hole.

In order to set the trap of my invention, the operator grasps fingerhold portion 34 with one hand, and with his other hand grasps the base of the trap and presses downwardly with one finger upon the arm portion 62. Fingerhold portion 34 is then rotated in a counterclockwise direction against the tension of spring 24 to separate the impaling members 13 and 14. Arm 49 then engages in one of the notches 51, depending upon how far the fingerhold portion 34 is rotated. The operator then engages shoulder element 63 with arm portion 62, and arm 49 is thereby retained or locked into engagement with one of notches 51, and the trap is set. The particular notch with which arm 49 is engaged will depend of course upon the size of a hole into which the trap is to be placed. After the trap has been operably positioned within a gopher hole, a comparatively slight pressure upon trigger member 54 will effect disengagement of shoulder 63 from arm portion 62, with the result that plate 33 will be released to rotate under tension of spring 24, and thus bring the impaling members toward each other. The openings 56 in trigger member 54 permit a certain amount of fine dirt pushed ahead by a gopher, to sift thru the same and thus preclude premature springing of the trap. A hole is also provided in portion 26 for the same purpose. The disalinement of shafts 11 and 12 makes possible proper gripping action of the impaling members 13 and 14, and facilitates making operable connection to the spring 24 to get full jaw movement. The fact that different metals are utilized for forming engagements in my trigger mechanism makes possible sensitive trigger action at all times, which I have found neccessary to secure consistent results. The crossed relationship of the impaling members 13 and 14 when the trap is in normal sprung position, precludes the possibility of the gopher escaping after once caught. Because of the positioning of pivotal points 43 and 46 with respect to points 44 and 47 when the trap is sprung, it is evident that the mechanical advantage of the mechanism connecting spring 24 with shafts 11 and 12 increases as the impaling members approach each other, thus compensating for decreasing torque of the spring and insuring adequate gripping of an animal.

I claim:

1. In an animal trap, a base member, a pair of spaced shafts journaled to said base member, a helical spring adapted to be placed under torsional tension, and means for operably connecting one end of said spring to both said shafts whereby said shafts are normally urged to rotate in opposite directions.

2. In an animal trap, a base member, a pair of spaced shafts journaled to said base member, a helical spring adapted to be placed under torsional tension, and linkage mechanism for operably connecting one end of said spring to both said shafts whereby said shafts are normally urged to rotate in opposite directions.

3. In an animal trap, a base member, a pair of spaced shafts journaled to said base member, a pair of impaling members secured to said shafts and extending laterally from the same, a helical spring adapted to be placed under torsional tension, and leverage means for operably connecting one end of said spring to both said shafts whereby said shafts are normally urged to rotate in opposite directions.

4. In an animal trap, a base member, a pair of shafts journaled to said base member, laterally extending lever arms carried by corresponding ends of said shafts, impaling members carried by the other ends of said shafts, a rotatable member operably connected to said arms, spring means for normally urging said member to rotate in one direction, links connecting spaced points on said member to the ends of said arms, and trigger means for retaining said rotatable member in releasable set position with said impaling members spread.

5. In an animal trap, a base member, a pair of shafts journaled to said base member, laterally extending arms carried by corresponding ends of said shafts, impaling members carried by the other ends of the shafts, a rotatable member operably connected to said arms whereby upon rotation of said member in one direction, said shafts are rotated in opposite directions, a plurality of notches formed in said member, and trigger means including a member optionally engageable in any one of said notches.

6. In an animal trap, a base member, a pair of shafts journaled to said base member, laterally extending arms carried by corresponding ends of said shafts, impaling members carried by the other ends of said shafts, a rotatably member operably connected to said arms whereby upon rotation of said member in one direction said shafts are rotated in opposite directions, a plurality of notches formed in said member, a rod journaled to said base, an arm secured to said rod and engageable in any one of said notches, another arm secured to said rod and a trigger member adapted to engage said last named arm.

7. In an animal trap, a base member, a pair of shafts journaled to said base member, a plate rotatable about an axis generally alined with respect to said shafts, impaling members secured to corresponding ends of said shafts, arms carried by the other corresponding ends of said shafts, links pivotally connected to the ends of said arm and pivotally connected to the plate at spaced points on said plate, said points being located at opposite sides of the axis of rotation of the plate, spring means for effecting rotation of said plate in one direction to force the impaling members together toward sprung position of the same, the points of pivotal connection of the links with said arm lying between said pivotal points on the plate when the trap is in normal sprung position, and trigger means for retaining said plate in such position against the tension of the spring means.

8. In an animal trap, a base member, a pair of shafts journaled to said base member, a plate rotatable about an axis generally alined with respect to said shafts, impaling members secured to corresponding ends of said shafts, arms carried by the other corresponding ends of said shafts, links pivotally connected to the ends of said arms and also pivotally connected to the plate at spaced points on the plate, said points being located at opposte sides of the axis of rotation of said plate, spring means for normally urging said plate to rotate in one direction to force the impaling members together towards sprung position of the same, the points of pivotal connection of the links with said arms lying between said pivotal points to the plate when the shaft is in normal sprung position, a plurality of notches formed along one edge of said plate, and trigger means engageable in any one of said notches.

In testimony whereof, I have hereunto set my hand.

JAMES MARTIN ABEEL.